March 23, 1965  R. H. KATZENBERGER  3,174,360
VIBRATION DAMPER
Filed May 29, 1963

INVENTOR.
RALPH H. KATZENBERGER
BY
Lockwood, Woodard, Smith & Weikart
Attorneys

United States Patent Office 3,174,360
Patented Mar. 23, 1965

3,174,360
VIBRATION DAMPER
Ralph H. Katzenberger, Indianapolis, Ind., assignor to Schwitzer Corporation, Indianapolis, Ind., a corporation of Indiana
Filed May 29, 1963, Ser. No. 284,168
8 Claims. (Cl. 74—574)

This invention relates generally to vibration dampers and in particular to a damper utilizing a novel means for maintaining a minimum fluid film thickness between the relatively movable components of the damper assembly.

In Troyer U.S. Patent 2,939,338, assigned to the assignee of the present invention, there is disclosed and claimed viscous vibration dampers of the type here referred to which utilize a driving member formed by a disc. The disc is radially slotted to provide fingers which are deformed so as to extend in alternately opposite directions out of the plane of the disc and thereby tend to reduce to a minimum the fluid film between one side face of the fingers and the adjacent inertia member. One difficulty in this type of driving member component is that, since only one face of each of the fingers can be effectively related to the adjacent surface of the inertia member, the effective area of the driving member, and hence the capacity of the damper assembly, is limited.

The structure of the present invention utilizes annular, wave-type springs between the side faces of the driving member and the adjacent faces of the inertia member to provide a maximum area effective in defining the fluid film between the driving member and the inertia member with, if desired, maximum unit pressure applied by the springs to the fluid film.

The primary object of the present invention is to provide a damper structure in which wave-type, annular springs are utilized to control at least one component of the total force resisting relative motion between the driving and inertia member components of the damper structure.

A further object of the present invention is to provide a tuned, viscous vibration damper in which the thickness of the effective fluid film between the damper components is defined by wave type springs.

These and other objects will become apparent as the description proceeds with reference to the accompanying drawings in which.

Figure 1:
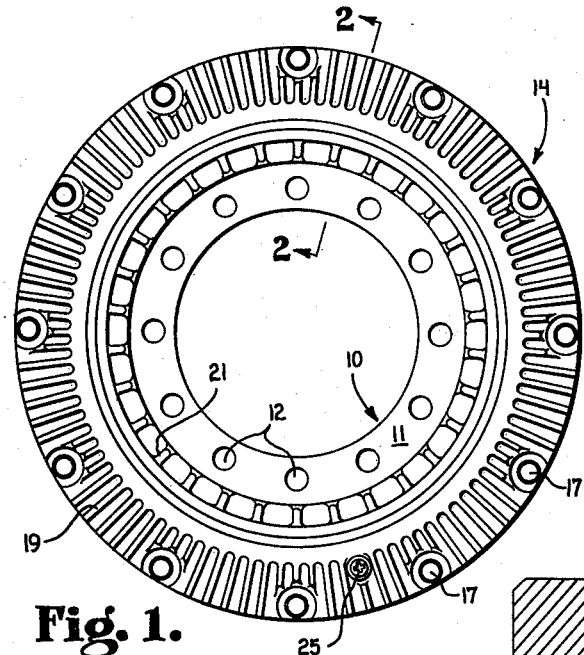
FIG. 1 is a front view of a damper assembly embodying the present invention.
Figure 3:
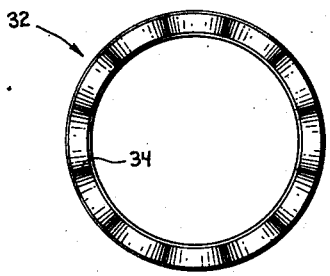
FIG. 3 is a front view of the wave spring component of the damper assembly.
Figure 2:
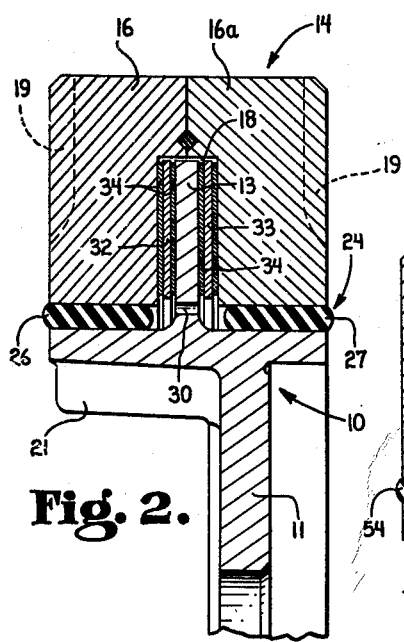
FIG. 2 is a fragmentary, side-sectional view of the damper assembly of FIG. 1 taken generally along the line 2—2 of FIG. 1.

Referring initially to FIGS. 1–4, the assembly embodying the present invention comprises a generally annular shaped driving member 10, having a radially inwardly extending portion 11. The inwardly extending portion 11 is adapted to be mounted on a hub, accessory drive pulley, or similar means conventionally associated with the crank shaft of a reciprocating, internal combustion engine. A plurality of apertures 12 may be provided to receive bolts for attaching the driving member as described above. The driving member 10 is further provided with a radially outwardly extending flange 13 (FIG. 2).

The driven inertia member, indicated generally at 14 is formed of two annular sections 16 and 16a which are held in assembled relation by means of rivets 17 (FIG. 1). Before assembly, the members 16 and 16a are machined to form a radially outwardly extending cavity 18 which freely accommodates the radially extending flange 13 of the driving member. The exterior surfaces of the members 16 and 16a are formed to provide ribs or fins 19 which aid in the dissipation of heat from the assembly. The ribs 21 formed in the outer surfaces of the driving member 11 serve to reduce the mass to surface area ratio and facilitate the removal of heat from the assembly.

Interposed between the driven member 14 and the driving member 10 is an elastic means indicated generally at 24. The elastic means includes two annular elastic bands 26 and 27, which are arranged in side-by-side relation adjacent to the open, inner end of the cavity 18. The bands 26 and 27, confined between the driving and driven members, may be formed of rubber or a similar elastic composition and may be injected into the space between the driving and driven members either prior to or after curing. These bands may be in a state of radial compression in the assembly and a suitable bonding agent may be applied between the elastic element and the driving and driven members, depending upon the mode of manufacture used and the operational conditions. The material forming the elastic bands is selected so that it has physical properties which provide the desired natural frequency for the damper. The elastic means thus tunes the damper to the desired natural frequency.

Figure 4:
FIG. 4 is a perspective view of the wave spring shown in FIG. 3.

An aperture through the member 16, closed by the pipe plug 25 (FIG. 1) permits filling of the cavity 18 with a conventional viscous shear fluid such as a silicone oil. A series of apertures 30 (FIG. 2) in the flange 13 provide communication between the portions of the cavity 18 lying on opposite sides of the flange 13. Interposed between the adjacent faces of the flange 13 and the driven member elements 16 and 16a are wave springs 32 and 33. The wave springs are identical and one of them is shown in detail in FIGS. 3 and 4. The springs are annular in form, and, as will be evident from FIG. 4, are provided with a wave-like configuration formed by a series of spaced high and low points. As used herein the term "wave spring" is intended to indicate an annular band having an unstressed configuration exhibiting a series of undulations around the spring surface. Where the loads imposed on the adjacent surfaces are relatively high, the annular side faces of each of the wave springs may be provided with a facing 34 which prevents galling of the spring surfaces with the adjacent cavity and flange faces. This facing may be conveniently applied by superimposing annularly shaped layers of suitable anti-galling material on both of the side faces of the spring. In assembling the damper the springs 32 and 33 are disposed within the cavity 18 and are stressed so that they are substantially flat. The force exerted by the spring when thus under stress urges the facings 34 outwardly against the adjacent flange faces and cavity faces.

In operation, with the driving member turning with a shaft subject to torsional vibration, one portion of the vibration will be absorbed by the elastic means formed by the bands 26 and 27, and a portion of the vibration will be absorbed by the resistance to shear of the fluid film existing between the facings 34 of the wave springs and the adjacent side faces of the cavity 18 and the flange 13. The force exerted by the wave springs, that is the force exerted on the fluid film, serves to maintain the film at the desired thickness, the resistance to shear characteristics of the fluid being dependent on the thickness of the fluid film.

Figure 5:
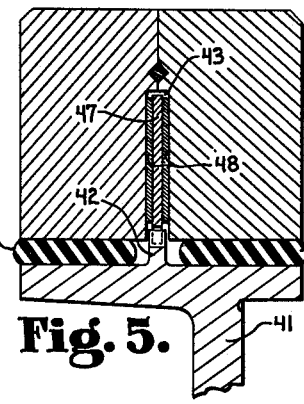
FIG. 5 is a fragmentary, side-sectional view similar to FIG. 2 but illustrating a modified form of the damper assembly.

Referring now to FIG. 5, a modified form of the structure will be described. The structure of FIG. 5 differs primarily from that previously described in that there is no radially outwardly extending flange portion on the driving member but, instead, the single wave spring is formed so as to rotate with the driving member. In FIG. 5, the driving member 41, similar in configuration to the driving member 11 of FIG. 2, has a series of gear teeth 42 formed at the portion thereof which extends across the open end of the cavity 43 and between the elastic members 44 and 46. The cavity 43 is smaller in width than the cavity 18 of FIG. 2 and a single wave spring 47 is disposed therein. The wave spring 47 may carry facing 48 and is of the same wave form as the spring 32 of FIGS. 3 and 4. It differs therefrom in that its inner marginal portion is cut to provide a series of teeth which engage with the gear teeth 42 on the driving member 41.

In operation, with member 41 rotating at high speed, the elastic members 44 and 46 will absorb a portion of the torsional vibration and the fluid film existing at the side faces of the cavity 43 will absorb a further component because of its resistance to shearing stress.

Figure 6:
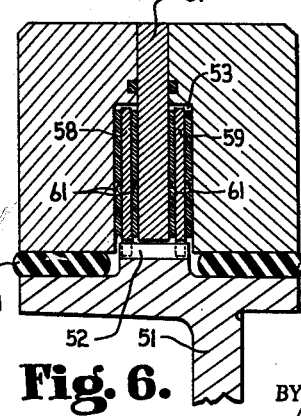
FIG. 6 is a view similar to FIG. 5 but illustrating a further modified form of the damper assembly.

Referring to FIG. 6, a further modified form of the structure is shown. The structure of FIG. 6 is similar to that of FIG. 5 in that the wave springs are engaged by teeth on the driving member and are rotated with the driving member, but differ from the disclosure of FIG. 5 in that two wave springs are utilized and the cavity in the driven inertia member is provided with an insert which provides two additional working faces. In FIG. 6, the driving member is indicated at 51 and the portion of the driving member which extends across the open end of the cavity 53 is formed to provide gear teeth 52. The elastic members 54 and 56 are interposed between the driven inertia member and the driving member and the driven inertia member is provided with an insert 57 which extends into the cavity 53. The wave springs 58 and 59 are interposed between the adjacent faces of the cavity 53 and the insert 57. The wave springs are similar to that described with reference to FIGS. 3 and 4 in that they may carry facings 61, however, they differ in that they are provided with teeth on their inner margin which mesh with the teeth 52. The operation of this form of the invention is identical in principle to that of the modification described with reference to FIG. 5.

Figure 7:
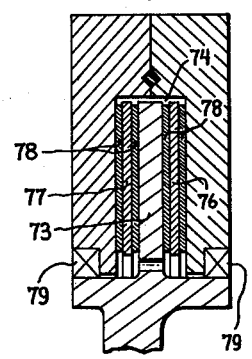
FIG. 7 is a view similar to FIG. 6 but illustrating a still further modified form of a damper assembly which does not use elastic elements.

Referring to FIG. 7, a further modified form of a damper assembly embodying the present invention will now be described. The structure shown in FIG. 7 is similar to that of FIG. 2 except that it omits the elastic means between the driving and driven members and is therefore an untuned type of viscous fluid damper. In FIG. 7, the driving member is identified at 71 and the driven inertia member at 72. The driving member is provided with a radially outwardly extending flange 73 and the driven member is provided with a radially extending cavity 74. Wave springs 76 and 77 are interposed between the adjacent faces of the cavity and the flange. The wave springs may carry facing 78 and are identical in configuration to the wave springs 32 and 33 of FIG. 2. As previously mentioned, the elastic means is omitted from the structure of FIG. 7, however, the oil seals 79 make the chamber formed by the cavity 74 fluid tight. In operation, torsional vibration appearing in the shaft on which the driving member 71 is mounted will be damped by the resistance to shearing stress exhibited by the fluid film existing between the faces 78, or the spring faces where facing 78 is omitted, and the adjacent faces of the cavity 74 and flange 73.

From the foregoing it will be understood that the structure of the present invention provides a damper assembly which can be manufactured and assembled economically and in which the wave springs defining the thickness of the effective fluid film provide a maximum working surface and permit relatively high unit pressure on the fluid film existing between the driving and driven members.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A torsional vibration damper assembly for mounting in operative relation to the crankshaft of an internal combustion engine comprising a generally annular driving member having a radially inwardly extending surface for concentric attachment to a crankshaft and having a radially outwardly extending flange, a driven inertia member mounted concentrically of said driving member and having a central aperture therein accommodating said driving member, said driven member being provided with a radially outwardly extending cavity freely accommodating said outwardly extending flange of said driving member, elastic means interposed between said driving and driven members including elastic bands on opposite sides of said driving member flange, said bands sealing said cavity to form a fluid chamber, a viscous fluid within said chamber, and means defining the thickness of the fluid film adjacent the side faces of said cavity and said driving member flange, said last mentioned means comprising wave springs having annular side surfaces provided with anti-galling facing and interposed in said cavity between the adjacent faces of said cavity and driving member flange, said wave springs urging their facing toward said adjacent cavity and flange faces to minimize the thickness of the viscous fluid film therebetween.

2. A torsional vibration damper assembly for mounting in operative relation to a shaft subject to torsional vibration comprising a generally annular driving member having a radially inwardly extending surface for concentric attachment to said shaft and having a radially outwardly extending flange, a driven inertia member mounted concentriclly of said driving member and having a central aperture therein accommodating said driving member, said driven member being provided with a radially outwardly extending cavity freely accommodating said outwardly extending flange of said driving member, elastic means interposed between said driving and driven members including elastic bands on opposite sides of said driving member flange, said bands sealing said cavity to form a fluid chamber, a viscous fluid within said chamber, and means defining the thickness of the fluid film adjacent the side faces of said cavity and said driving member flange, said last-mentioned means comprising wave springs having annular side surfaces and interposed in said cavity between the adjacent faces of said cavity and driving member flange, said wave springs urging their side surfaces toward said adjacent cavity and flange faces to minimize the thickness of the viscous fluid film therebetween.

3. A torsional vibration damper assembly for mounting in operative relation to a shaft subject to torsional vibration comprising a generally annular driving member having a radially inwardly extending surface for concentric attachment to said shaft and having an outwardly extending flange, a driven inertia member mounted concentrically of said driving member and having a central aperture therein accommodating said driving member, said driven member being provided with an outwardly extending cavity freely accommodating said outwardly extending flange of said driving member, elastic means interposed between said driving and driven members including elastic bands on opposite sides of said driving member flange, said bands sealing said cavity to form a fluid chamber, a viscous fluid within said chamber, and means defining the thickness of the fluid film adjacent at least one side face of said cavity and said driving member flange, said last-mentioned means comprising a wave spring having annular side surfaces and interposed in said cavity between the said one face of said cavity and driving member flange, said wave spring urging its side surfaces toward said one cavity face and adjacent flange face to minimize the thickness of the viscous fluid film therebetween.

4. A torsional vibration damper assembly for mounting in operative relation to a shaft subject to torsional vibration comprising a generally annular driving member having a radially inwardly extending surface for concentric attachment to said shaft and having a radially outwardly extending flange, a driven inertia member mounted concentrically of said driving member and having a central aperture therein accommodating said driving member, said driven member being provided with a radially outwardly extending cavity freely accommodating said outwardly extending flange of said driving member, elastic means interposed between said driving and driven members for sealing said cavity to form a fluid chamber, a viscous fluid within said chamber, and means defining the thickness of the fluid film adjacent at least one side face of said cavity and said driving member flange, said last-mentioned means comprising a wave spring having annular side surfaces and interposed in said cavity between the said one face of said cavity and driving member flange, said wave spring urging its side surfaces toward said one cavity face and adjacent flange face to minimize the thickness of the viscous fluid film therebetween.

5. A torsional vibration damper assembly for mounting in operative relation to a shaft subject to torsional vibration comprising a generally annular driving member having a radially inwardly extending surface for concentric attachment to said shaft and having a radially outwardly extending flange, a driven inertia member mounted concentrically of said driving member and having a central aperture therein accommodating said driving member, said driven member being provided with a radially outwardly extending cavity freely accommodating said outwardly extending flange of said driving member, means interposed between said driving and driven members for sealing said cavity to form a fluid chamber, a viscous fluid within said chamber, and means defining the thickness of the fluid film adjacent the sides of said cavity and said flange, said last-mentioned means comprising wave springs having annular side surfaces and interposed in said cavity between the adjacent faces of said cavity and driving member flange, said wave springs urging their side surfaces into engagement with said adjacent cavity and flange faces.

6. A torsional vibration damper assembly for mounting in operative relation to the crankshaft of an internal combustion engine comprising a generally annular driving member having a radially inwardly extending surface for concentric attachment to a crankshaft, a driven inertia member mounted concentrically of said driving member and having a central aperture therein accommodating said driving member, said driven member being provided with a radially outwardly extending cavity, elastic means interposed between said driving and driven members including elastic bands on opposite sides of said cavity, said bands sealing said cavity to form a fluid chamber closed at its inner end by said driving member, a viscous fluid within said chamber, and means defining the thickness of the fluid film adjacent the side faces of said cavity, said means comprising a wave spring disposed in said cavity having annular side faces, the portion of said driving member closing said cavity and the inner marginal portion of said annular wave spring being adapted to provide for rotation of said wave spring by said driving member, said wave spring urging its side faces toward the adjacent cavity faces to minimize the thickness of the viscous fluid film therebetween.

7. A torsional vibration damper assembly for mounting in operative relation to a shaft subject to torsional vibration comprising a generally annular driving member having a radially inwardly extending surface for concentric attachment to said shaft, a driven inertia member mounted concentrically of said driving member and having a central aperture therein accommodating said driving member, said driven member being provided with a radially outwardly extending cavity, elastic means interposed between said driving and driven members including elastic bands on opposite sides of said cavity, said bands sealing said cavity to form a fluid chamber closed at its inner end by said driving member, a viscous fluid within said chamber, and means defining the thickness of the fluid film adjacent the side faces of said cavity, said means comprising a wave spring disposed in said cavity having annular side surfaces, the portion of said driving member closing said cavity and the inner marginal portion of said annular wave spring being adapted to provide for rotation of said wave spring by said driving member, said wave spring urging its side surfaces toward the adjacent cavity faces to minimize the thickness of the viscous fluid film therebetween.

8. A torsional vibration damper assembly for mounting in operative relation to a shaft subject to torsional vibration comprising a generally annular driving member having a radially inwardly extending surface for concentric attachment to said shaft, a driven inertia member mounted concentrically of said driving member and having a central aperture therein accommodating said driving member, said driven member being provided with two radially outwardly extending cavities, elastic means interposed between said driving and driven members including elastic bands outboard of said cavities, said bands sealing said cavities to form a fluid chamber closed at its inner end by said driving member, a viscous fluid within said chamber, and means defining the thickness of the fluid film adjacent the side faces of said cavities, said means comprising a wave spring disposed in each of said cavities having annular side surfaces, the portion of said driving member closing said cavities and the inner marginal portion of said annular wave springs being adapted to provide for rotation of said wave springs by said driving member, said wave springs urging their side surfaces toward the adjacent cavity faces to minimize the thickness of the viscous fluid film therebetween.

References Cited by the Examiner

UNITED STATES PATENTS

| 2,092,571 | 9/37 | Cole | 74—574 |
| 2,939,338 | 6/60 | Troyer | 74—574 |
| 3,077,123 | 2/63 | Katzenberger | 74—574 |

FOREIGN PATENTS

| 427,138 | 4/35 | Great Britain. |

BROUGHTON G. DURHAM, *Primary Examiner*.